Figure 1:
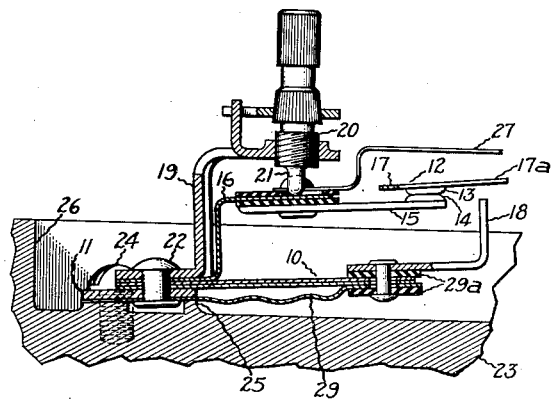

Dec. 9, 1941.                J. R. CAMPBELL                2,265,684
                      TEMPERATURE CONTROL DEVICE
                         Filed Sept. 12, 1939

Inventor:
James R. Campbell,
by Harry E. Dunham
His Attorney.

Patented Dec. 9, 1941

2,265,684

UNITED STATES PATENT OFFICE 2,265,684

TEMPERATURE CONTROL DEVICE

James R. Campbell, Ontario, Calif., assignor to General Electric Company, a corporation of New York Application September 12, 1939, Serial No. 294,492

3 Claims. (Cl. 200—138)

This invention relates to temperature control devices, and it has for its object the provision of an improved device of this character.

This invention is particularly applicable to temperature control devices for controlling an electric circuit in accordance with temperature changes, such as the heating circuit of an electrically heated flatiron. It is to be understood, however, that this invention has more general application and is not limited to flatirons and similar electrically heated devices that have a heated solid medium. It may be used in other applications where the temperature of a fluid medium is to be controlled, such as the oven of an electric range.

In the electrically heated devices, it is desirable to place the controlling thermostat in direct thermal relation with the medium whose temperature is being controlled whether the medium be a solid or a fluid. For example, in a flatiron a portion of the thermostat is clamped to the sole plate. In an electric range oven a portion of the thermostat is projected into the oven space so as to be immersed in the gaseous contents of the oven. However, in some cases it is not possible and in others not desirable to place the entire length of the thermostat in direct thermal relation with the medium whose temperature is being controlled because the thermostat is provided with a section that must be free to move to operate a heat controlling device that must or should be removed from the controlled medium. In the case of a flatiron, this movable portion cannot be placed in contact with the sole plate; in the case of an oven, it is desirable to remove the movable portion from the gaseous medium to protect the heat controlling elements that are operated by the thermostat.

It has been found where a portion only of the thermostat is in direct thermal relation with the heated medium that when the device whose temperature is being controlled is being initially heated from its room temperature, there is a tendency for the temperature of the heated body or medium to rise more rapidly than does the temperature of the thermostat. Due to this rapid rise in temperature during the heating cycle there occurs a temperature overshoot; that is, the temperature at which the thermostat operates to shut off the heat in the first heat cycle is higher than the cut-off temperature of the succeeding cycles.

In certain high wattage electrically heated devices, such as a flatiron, this overshoot in the first cycle might be quite high, in fact so high that the iron will scorch certain fabrics if it be used when in this overheated condition.

It is an object of this invention to eliminate this temperature overshoot and thereby to increase materially the sensitivity of the control device.

In accordance with this invention, I provide suitable auxiliary means for directly conducting heat from the heated body or medium to the movable section of the thermostat that operates the heat control device. Heat, therefore, is imparted to the movable section of the length of the thermostat, in addition to that which is fed to the section which is attached to the control body, or to that which projects into a heated space. In one form of this invention, a metallic heat conducting strip has one end placed in direct heat conducting relation with the controlled body or medium, and has its opposite end connected to the thermostatic element at one point. In another form of this invention, the heat conducting strip is secured to the thermostat at a relatively large number of points spaced along its length. In still another form, the heat conducting strip is secured to the thermostatic member continuously from end to end.

Figure 2:
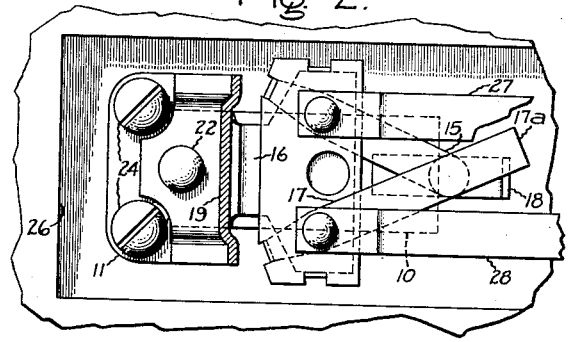
Figure 3:
Figure 4:

For a more complete understanding of this invention, reference should be had to the accompanying drawing in which Fig. 1 is an elevation mainly in section of a temperature control device embodying this invention, the control device being shown as applied to an electrically heated flatiron, a section of the sole plate of which is illustrated; Fig. 2 is a plan view of the control device of Fig. 1; Fig. 3 is an enlarged sectional view of a thermostat of modified form embodying this invention; and Fig. 4 is a view similar to Fig. 3 but illustrating still another form of this invention.

Referring to the drawing, this invention has been shown in one form as applied to the temperature control device described and claimed in my U. S. Patent No. 2,158,850, dated May 16, 1939. It is to be understood, however, that this invention is not limited to this specific control device, but has wide application to temperature sensitive control elements. As shown, the control device comprises a bimetallic temperature responsive element 10 formed of two strips of metal having dissimilar temperature coefficients of expansion, such as Invar and steel, secured together lengthwise from end to end in any suitable manner, as by welding. The left-hand end of the bimetallic bar 10, as viewed in the drawing, is rigidly secured to a clamping plate 11, while its righthand end is free to move responsively to temperature changes in the bar 10. In the specific form shown in Fig. 1, the lower metal of the bar 10 is the high expansion element so that the free end of the bar moves upwardly as the temperature of the bar increases, and moves downwardly as the temperature of the bar is decreased.

The movable end of the bimetallic bar is used to operate a switch 12 having a pair of cooperating contacts 13 and 14. The lower contact 14 is mounted upon a rigid arm 15 which in turn has its left-hand end, as viewed in Fig. 1, rigidly secured to a bracket 16 formed of a suitable flexible material. The other contact 13 is mounted upon a flexible switch arm 17 which also has its left-hand end rigidly secured to the resilient bracket 16.

The free end of the bimetallic bar 10 carries an L-shaped operating member 18 extending upwardly for engagement with an extension 17a on the arm 17 that lies over the member 18. When the free end of the bar moves upwardly in response to a temperature increase it will engage the extension 17a and will operate to separate the contacts 13 and 14. Conversely, when the temperature of the bar decreases the member 18 will be withdrawn from the extension 17a and will permit the contacts to reclose.

A rigid bracket 19 carries an adjusting screw 20 which on its lower end is provided with an abutment 21 that engages the flexible bracket 16 to vary the positions of the switch arms 15 and 17 with reference to the operaing member 18. This, of course, adjusts the temperature setting. If the abutment 21 be moved downwardly sufficiently far it will effect a separation of the contacts 13 and 14 by moving the rigid arm 15 away from the flexible arm 17 after the latter arm has engaged the operating member 18. The rigid support 19, the flexible bracket 16, the bimetallic thermostatic strip 10 and the clamping plate 11 are all rigidly secured together by means of a rivet 22.

In Fig. 1, the control device is shown as applied to an electrically heated flatiron having a sole plate 23. The clamping plate 11 is rigidly secured in direct thermal relation with the sole plate 23 by means of screws 24 directed through apertures provided for them in the clamping plate 11 and received in threaded openings provided for them in the sole plate. Preferably, the sole plate will be provided with an elevated seat 25 upon which the clamping plate is mounted, as clearly shown in Fig. 1. Also preferably this seat 25 will be arranged in the bottom of a recess 26 provided in the sole plate. It will be understood that the sole plate 23 will be provided with a suitable electrical heating element (not shown) and that the contacts 13 and 14 will be connected in the energizing circuit of this element in series with it so that when the iron is connected to an electrical supply source and the contacts are open the heating element is deenergized and when they are closed the heating element is energized. Suitable leads 27 and 28 are provided to connect the switch contacts in the energizing circuit. These leads are electrically connected respectively with the switch arms 15 and 17. The lead 27 may be connected with one of the conventional twin supply terminals of the iron, while the lead 28 may be connected with one end of the heating element; the opposite end of the heating element will be connected with the other supply twin terminal of the iron.

Even though the bimetallic thermostatic member 10 is secured directly in thermal relation with the sole plate 23 through the clamping member 11, and even though its movable portion lies relatively close to the sole plate in overhanging relation, as shown, and even though the bar is mounted in the recess 26, nevertheless there results a considerable temperature overshoot in the first heat cycle. This is due to the fact that the thermostatic bar is in direct thermal relation with the heated body 23 at only one point where its fixed end is attached to the body. In view of the fact that the thermostatic bar receives substantially all of its heat by conduction from the body 23, the heat necessarily flows from the fixed end of the bar to its free movable end. The bar, of course, has thermal resistance to the flow of heat from the fixed to the movable end, and in view of this there is an initial temperature gradient along the length of the thermostat from the fixed end to the movable end, the higher temperature of the gradient, of course, being at the fixed end. Therefore, if the iron at room temperature be connected to an electrical supply source and heat be applied to the sole plate 23 from its heating unit, the temperature in the sole plate will rise rapidly, while that of the thermostatic bar lags behind it and follows the temperature rise in the sole plate at a rate which depends upon the magnitude of the initial temperature gradient. This gradient in turn depends upon the thermal resistance of the thermostatic bar 10, the rate at which the heat is introduced into the sole plate 23 and the rate at which the heat from the sole plate is imparted to the fixed end of the blade.

Because of this time lag in temperature rise in the thermostatic bar during its first heat cycle, the first operation of the bar to open the switch results from deflection upwardly of that portion of the blade closest to the fixed end, the effect of the free end portion of the blade being substantially negligible due to the fact that it still is relatively cool. The temperature of the sole plate 23 at which the thermostat opens the switch 12 to shut off the heat, therefore, is higher than it would be if the entire length of the blade were heated to its saturated condition and hence utilized to open the switch.

The blade, however, during the heating portion of the first cycle and also during the cooling portion of this cycle is being heated by the flow of heat from the sole plate and through the bar to its remote free end. Eventually the bar attains a saturated temperature condition, that is, a temperature condition wherein a final temperature gradient is established from the fixed to the free end. This gradient is materially less than the initial gradient and remains substantially unchanged during the following heat cycles. The magnitude of temperature from one end to the other of the bar, of course, changes with changes in the sole plate temperature but after saturation the gradient remains substantially constant. The bar generally will attain this saturated temperature condition during the first heating and cooling cycle. However, as a result of the delay in saturating the thermostatic bar during the cooling portion of the first cycle after heat has been cut off from the sole plate 23 instead of moving downwardly to permit the switch contacts 13 and 14 to reapply heat, actually at first curves upwardly as the bar saturates. Eventually due to the cooling of the sole plate and the attainment of the saturated temperature condition in the bar, the bar will reverse and move downwardly to permit the switch contacts to close. The delay in the movement of the bar downwardly to effect the closure of the switch contacts permits the sole plate temperature to fall to a lower minimum at the end of the first cycle than it should before heat is reapplied.

Due to this delay in closing the switch to reapply heat for the second cycle, the thermostat will act to cut off the heat in the second cycle at a materially lower temperature than the maximum cut-off temperature of the first cycle. In addition to this, in the second cycle, in contradistinction to the first, the whole thermostatic bar throughout its length curves upwardly in response to temperature rise in the sole plate in a direction to cut off and thereby contributes materially in effecting a premature cut-off. These two factors contribute to reduce the cut-off temperature in the second cycle. The remaining heat cycles follow the second so that the first cycle relative to the following cycles heats the iron to too high a temperature for the setting of the thermostat.

In order to obviate this difficulty, I provide a heat conducting strip 29 which has one end in direct thermal relation with the sole plate 23 and its opposite end in direct heat conducting relation with the free end of the bimetallic bar 10. The strip 29 is formed of any suitable material having a high heat conductivity, such as copper, which preferably should be nickel plated to render it resistant to oxidation. The member 29 is flexible so as to provide for freedom of movement of the bimetal bar 10. The bar 10 and the strip 29 are electrically insulated from the operating member 18 by insulating sheets 29a, preferably formed of mica.

The member 29 by directly imparting heat to the free end of the bimetallic bar 10 greatly accelerates the rate of saturation of the thermostatic bar and causes the free end portion of the bar also to function to cut off the heat in the first heat cycle. In other words, by reason of the provision of the conducting strip 29 heat is applied to both ends of the thermostatic bar thereby causing a much greater length of the thermostatic bar to be active under heat changes.

In the form of this invention shown in Fig. 3, the thermostatic bar 30 is provided with low and high expansion elements 31 and 32 which are rigidly secured together lengthwise from end to end, as by welding, and which may be formed of any suitable materials, such as Invar and steel. Here a high heat conducting strip 33 is secured to the composite bar 30 from end to end in any suitable manner, as by welding. In this case, of course, the heat conducting strip 33 carries heat to all portions of the bar 30 throughout its length. Here also, the strip 33 will have a very high heat conductivity and preferably will be made of copper. The copper strip will be applied to the high expansion side of the element, that is, to the element 32 in the form shown, because copper has a rather high coefficient of expansion and when so arranged will not interfere with the free warping action of the bimetallic bar 30.

In the form of the invention shown in Fig. 4, the bimetallic bar 34 has a low expansion element 35 and a high expansion element 36 and in all respects is similar to the thermostatic bar of Fig. 3. In this case, however, the heat conducting member 37 is formed with outwardly extending corrugations 38 and is spot welded to the thermostatic bar at points between these corrugations; the opposite end sections of the bar on opposite sides of the corrugations 38 are spot welded at intervals to the thermostatic bar 34. The corrugations lend a greater flexibility to the heat conducting strip 37 than in the case shown in Fig. 3.

The low expansion element of the thermostat does not change in length appreciably with temperature variations, but the length of the high expansion element changes materially with temperature changes. Therefore, the auxiliary heat conducting strip is generally much more effective when applied to the high expansion element, as shown in the various forms illustrated in the drawing.

As pointed out previously, this invention is not limited in its application to electrically heated flatirons. It is applicable generally to those devices wherein the thermostat has a limited area in contact with the controlled medium and is heated by the flow of heat from a local point to the other parts of the thermostat, the heat flowing by conduction from the application zone through the remaining sections of the thermostat.

While I have shown particular embodiments of my invention, it will be understood, of course, that I do not wish to be limited thereto since many modifications may be made, and I, therefore, contemplate by the appended claims to cover any such modifications as fall within the true spirit and scope of my invention.

What I claim as new and desire to secure by Letters Patent of the United States, is:

1. In electrically heated apparatus having a heated body and a heating element therefor, a temperature control device for said apparatus comprising a bimetallic thermostat bar having one end portion secured to said body in direct thermal relation with it and its other end portion relatively removed from direct thermal contact with said body, and free to move in opposite directions in response to temperature changes, a control element for said heating element, operated by said other end portion to control said heating element to apply heat to and shut off the heat from said body in a series of on and off heat cycles in response to decrease and increase in temperature of said thermostat bar, and a flexible metallic member having good heat conductivity having one end connected to said body in good thermal relation with it and its other end connected to said other end of said thermostat bar to conduct heat directly to it from said body and thereby increase the sensitivity of said control device, the portion of said member between its two ends being out of heat conducting relation with said thermostat bar so as to offer substantially no restriction to the movement of said bar.

2. In an electrically heated flatiron having a sole plate and an electrical heating element for said sole plate, a temperature control device for said flatiron comprising a bimetallic thermostat bar having one end portion clamped to said sole plate in good thermal relation with it and the remainder of said bar including its other end portion out of contact with said sole plate and lying substantially in the plane of said clamped end portion and free to curve in opposite directions relative to said sole plate in response to heating and cooling of said bar, a switch element operated by the free movable end portion of said bar to cause said heating element to apply heat to and cut it off from said sole plate in a series of on and off heat cycles depending upon the temperature condition of said bar, and a flexible metallic heat conducting member having one end secured in direct thermal relation with said sole plate and its other end secured to the other end portion of said bimetallic blade to conduct heat directly to it from said sole plate and thereby increase the sensitivity of said control device, the length of said heat conducting member between its ends being out of heat conducting relation with said thermostat bar so as to offer no restriction to the movement of said bar.

3. A temperature control device for a heated medium comprising a thermostat having a substantially fixed portion arranged to be placed in direct thermal relation with said medium and a second portion relatively removed from direct thermal relation with said medium and free to move in response to changes in temperature of said thermostat, a control member for controlling the application of heat to said medium operated by said second portion, a flexible metallic heat conducting member in direct thermal relation with said medium and secured to said thermostat only at said second portion thereof so as to conduct heat directly to said second portion from said medium and thereby increase the sensitivity of said control device, and the length of said heat conducting member between said medium and said second portion being out of heat conducting relation with the remainder of said thermostat so as to offer substantially no restriction to the movement of said second portion.

JAMES R. CAMPBELL.